April 2, 1929.  A. J. McEWAN  1,707,866
PRESSURE REGULATING VALVE
Filed Sept. 30, 1926  2 Sheets-Sheet 1
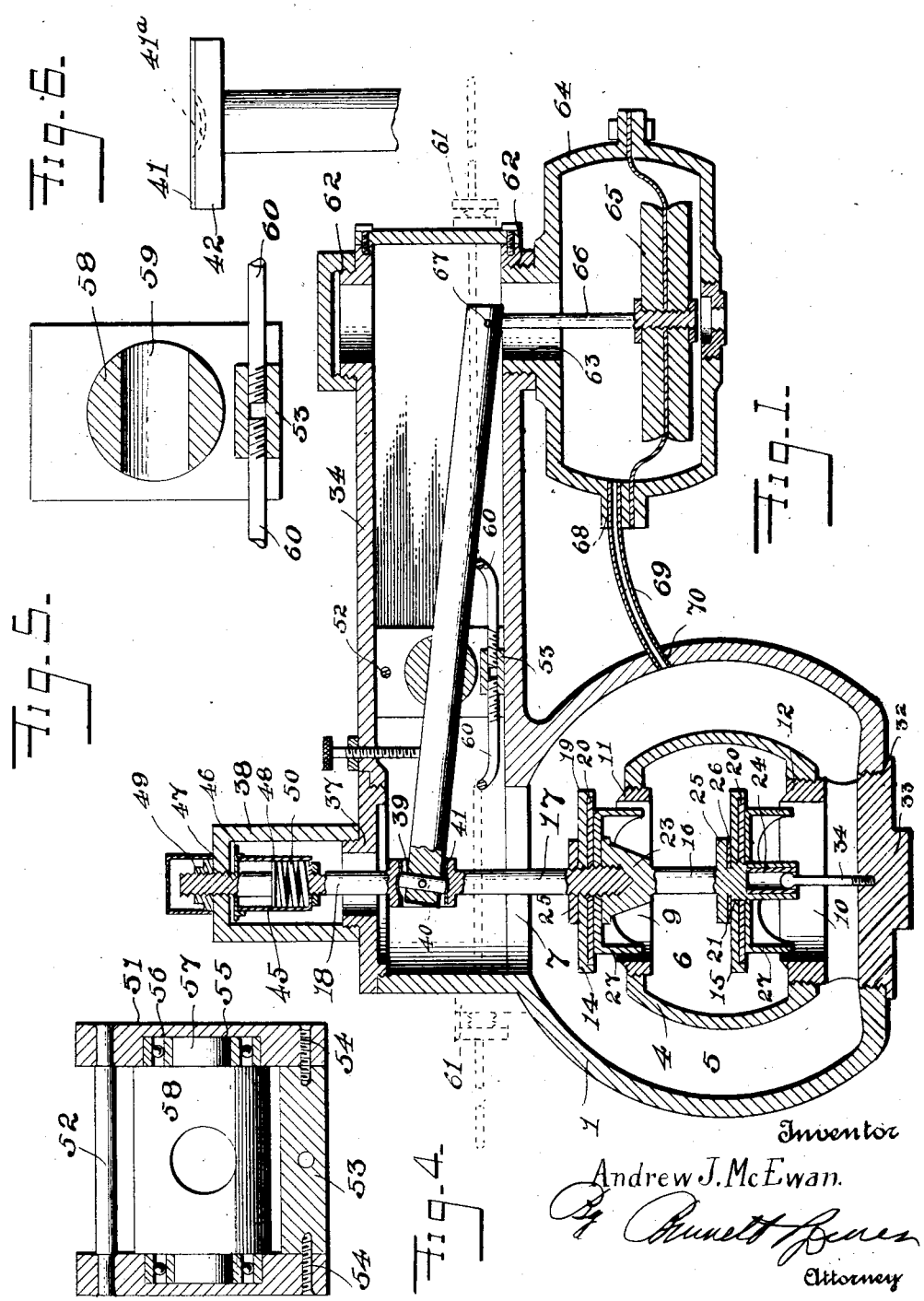
Inventor
Andrew J. McEwan.
Attorney April 2, 1929.  A. J. McEWAN  1,707,866
PRESSURE REGULATING VALVE
Filed Sept. 30, 1926   2 Sheets-Sheet 2
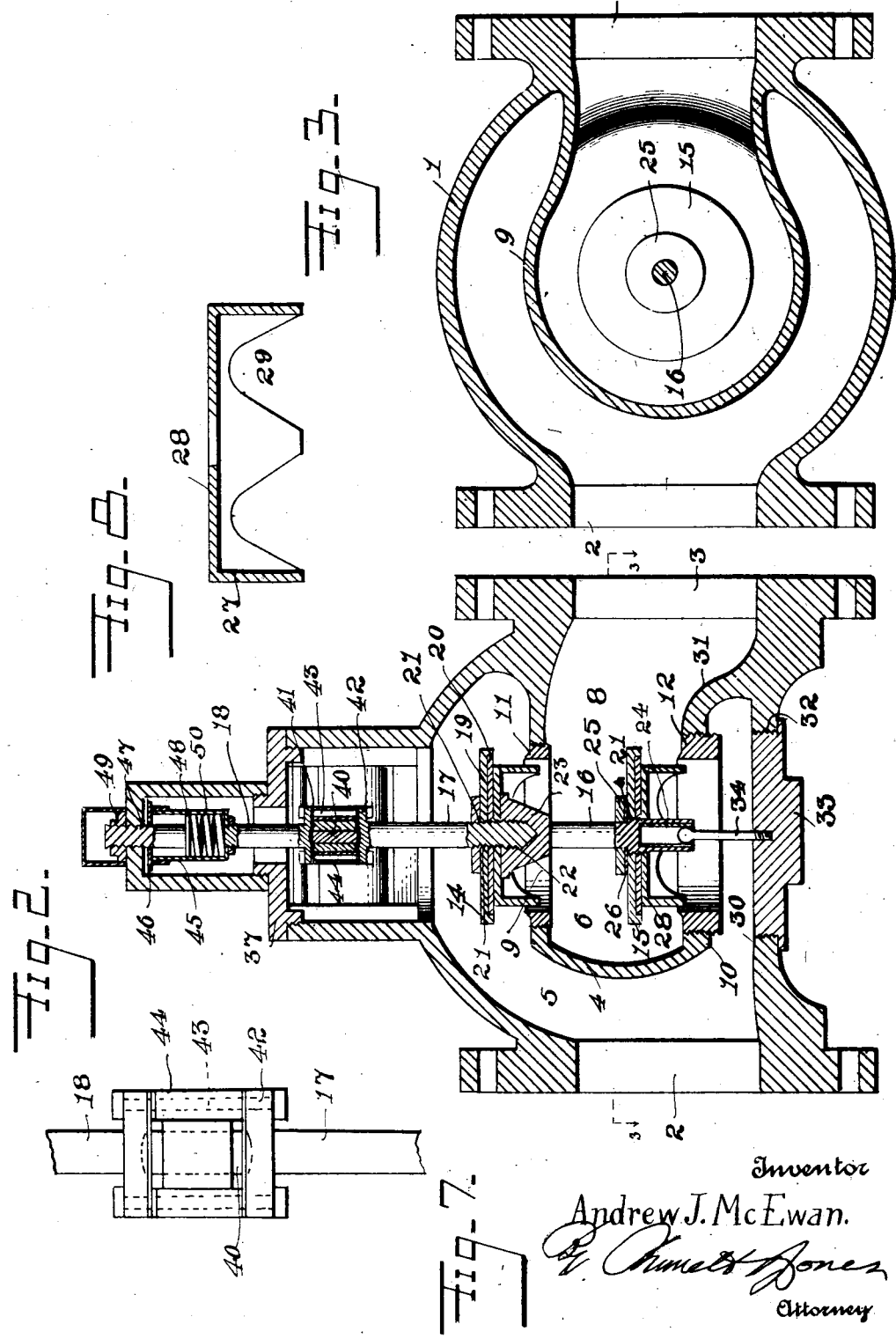

Patented Apr. 2, 1929.

1,707,866

UNITED STATES PATENT OFFICE.

ANDREW J. McEWAN, OF TULSA, OKLAHOMA.

PRESSURE-REGULATING VALVE.

Application filed September 30, 1926. Serial No. 138,784.

This invention relates to pressure regulating valves for regulating the flow of fluids and liquids through service systems, and particularly to pressure regulating valves of that type in which the valve is controlled by a lever mechanism governed in action by fluid pressure means, such as a diaphragm or piston, influenced by the pressure on one side of the valve.

One object of the invention is to provide a valve for controlling pressures between the high and low sides of a pipe line which is itself effectually balanced so that a sensitive valve control action may be obtained.

Another object of the invention is to provide a fluid pressure valve controlling mechanism including a lever and a shifting fulcrum for the lever adjustable to vary the power ratios controlling the action of the valve to adapt it to open or close with great reliability at a predetermined pressure.

Still another object of the invention is to provide a lever mechanism which is enclosed and protected from dirt, dust, rain and snow, as well as possible injury, and in which the shifting fulcrum is adjustable from the exterior of the enclosure.

Still another object of the invention is to provide a spring mechanism operative for either opening or closing the valve and embodying means for regulating the working action of the spring.

Still another object of the invention is to provide novel means for accurately guiding the valve in its movements.

Still another object of the invention is to provide a novel construction of valve stem, pivotal connection between the lever and stem, and connecting means between the stem and spring mechanism adapting the spring to be tensioned and reversed for valve opening or valve closing action.

Still another object of the invention is to provide a valve which is self-draining so that the valve will be kept clear of all liquids liable to congeal or otherwise interfere with the valve action and cause irregularities of action or undesirable pressure pulsations in the line.

Still another object of the invention is to provide simple and effective means to compensate for wear on the valve and the valve seats and whereby the valve may be kept in good seating order so as to prevent leakage without the necessity of regrinding the seat surface or removing the entire valve from the pipe line for this purpose.

Still another object of the invention is to provide removable and interchangeable reducers whereby the rate of flow of fluid past the valve may be accurately regulated for any given opening movement of the valve, so that a single valve may be employed in place of a plurality of valves of different sizes commonly required to be employed to meet different working conditions.

Still another object of the invention is to provide a valve which is simple of construction, reliable and efficient in operation, and adapted to be installed and maintained in working order at a comparatively low cost.

The invention consists of the features of construction, combination and arrangement of parts, hereinafter fully described and claimed, reference being had to the accompanying drawings, in which:—

Figure 1 is a vertical longitudinal section through a fluid pressure regulating valve embodying my invention.

Figure 2 is a vertical transverse section through the valve on line 2—2 of Figure 1.

Figure 3 is a horizontal section on line 3—3 of Figure 1.

Figure 4 is a vertical transverse section through the shifting fulcrum and lever.

Figure 5 is a longitudinal section thereof.

Figure 6 is a view of a portion of the intermediate valve stem section.

Figure 7 is a view showing the construction of the pivot yoke.

Figure 8 is a sectional view of a flow reducer.

In carrying my invention into practice, I provide a pressure regulating valve comprising a valve casing 1 having at diametrically opposite sides thereof ports 2 and 3, adapted to interchangeably serve as inlet and exhaust ports, and with which ports, in service, connect the high and low pressure pipes or mains (not shown) of a gas or oil and gas or other service system. The valve casing has arranged therein a partition 4 sub-dividing the same to form an outer chamber 5 and an inner chamber 6, and said valve casing is provided in its top with a port or passage 7. The partition 4 is joined to the side of the valve casing having the port 3, and is otherwise free from connection with the valve casing, the side of the partition adjacent to the port 2 being closed against direct communication with said port and with the chamber 5, while the side of the partition joined to the casing is formed with a lateral port 8 normally communicating with the port 3 and with the inner chamber 6. In the partition 4 are provided top and bottom ports 9 and 10 in which are fitted valve seat rings 11 and 12, said ports being controlled by a double valve, generally indicated at 13. When this valve is open communication is established between the ports 2 and 3 and chambers 5 and 6 through the ports 8, 9 and 10, but when the valve is closed communication between the ports 2 and 3 and chambers 5 and 6 is closed. Port 7, however, is always in communication with the port 2 and outer chamber 5.

The valve 13 comprises upper and lower valve members 14 and 15 which are of like area and always balanced against the pressures falling thereon. These valves are carried by a divided valve stem comprising three sections 16, 17 and 18. Each valve comprises a recessed or cupped valve body 19 within the recess of which fits a packing disk 20 of suitable material for engagement with the valve seat for a tight sealing action when the valve member is closed. Each valve body is also provided with a central threaded opening 21, and the opening 21 of the body member of valve 14 receives the lower threaded end 22 of the stem section 17, which engages a threaded socket or recess in a head or enlargement 23 at the upper end of the valve stem section 16, while the threaded opening 21 of the body of the valve 15 engages external threads in the tubular lower end 24 of the valve stem section 16, retaining nuts 25 engaging the threaded portions of the valve stem sections to hold the valve members from working loose on the threaded portions of the stem section. The cup-shaped valve bodies 19 are adapted to receive thin metal shims 26 insertible when necessary to compensate for wear of the packings 20 and to protect the packings, when worn, sufficiently to cause them to tightly engage their seats. These shims may be applied by simply removing the valves and valve stem as a unit through the top of the casing, as hereinafter described, so that by the insertion of one or more thin shims a leaky valve may be repaired and rendered tight fitting, when the valve seats and packings are more or less worn, so as to compensate particularly for wear upon the valve sets, without the necessity of disconnecting the valve casing from the pipe line. With each valve and valve seat may be associated, if desired, a reducer 27 comprising a central apertured body or top plate 28 having a depending flange formed with V-shaped slots 29 and correspondingly shaped wings between the slots. Each reducer is fitted in position beneath the valve member with which it cooperates by extending the valve stem through the aperture in its top and clamping the reducer in position as shown. This construction provides for the convenient use of interchangeable flow reducers having slots or flow passages 29 varying in size, so that the flow of fluid through the valve members, in any given open position thereof, may be regulated according to service conditions, without the necessity of a change in the size of the valve. The side of partition 4 which connects with casing 1 has its port 8 located above the level of the bottom of port 3, and also above the level of the bottom wall 30 of the valve casing, and a part 31 of the partition is arranged to form a dam wall to prevent entrance of liquid through the port 8 into the chamber 6 and interfering with the action of the valve. The wall 30 extends beneath the port 10 of the partition from the dam wall 31 to the port 2 on a general convex line of curvature, as shown in Figure 2, so that the major portion of said wall 30 lies above the level of the bottom of the port 2. By this construction, and by having the bottom of partition 4 containing port 10 also located above the level of the wall 30, a drain chamber is provided beneath the valve per se, into which any liquid finding its way into the chamber 5 or through the open valve ports 9 and 10 may pass, which liquid will drain by gravity through port 2 into the pipe or main connected therewith. By this means the accumulation of liquid liable to congeal in the valve casing and to interfere with movements of the valve and cause an obstruction to the flow of fluids or gases is prevented. As valves of the type to which the invention relates are commonly introduced between pipes or mains having liquid drain valves at intervals, it will be understood that all liquid draining from the valve into the pipes may be discharged from the pipe line, so as to keep the system clear from such obstructions. The wall 30 is provided with an opening 32 located below port 10 for the removal of any dirt or solid deposits at intervals from the valve casing, this opening also allowing access to the interior of the valve casing to afford greater freedom in assembling or disassembling the parts of the valve. A plug 33 is provided for normally closing this opening 32. This plug carries an upwardly extending guide stem 34 telescopically received within the tubular portion 24 of the valve stem section 16, the parts 24 and 34 forming coacting guide members to accurately guide the lower end of the valve stem and the valve members in their movements to and from their seats.

Communicating at its inner end with the valve casing chamber 5 through the port or passage 7 is a lever casing 34 which encloses a control lever 35. Above the port 7 this casing 34 is provided with an opening 36 normally closed by a threaded plug 37. The port 7 and the opening 36 are of suitable size to permit of the passage of the valve stem and valves in the operation of assembling or disassembling the valve, or for the removal of the valve structure or the substitution of new packing for old packing and the addition of shims to compensate for wear on the valve seats, as previously described. The valve stem section 8 projects upwardly through an opening in its plug 37 and into a bonnet 38 fitted thereon. The inner end of lever 25 is provided with a transverse bore 39 through which projects a hard metal pivot pin 40, which is suitably fastened in position and has convex upper and lower projecting end portions. These convex end portions of the pin 40 engage concaved seats 41ª in hard metal wear plates 41 carried by the opposed ends of the valve stem sections 17 and 18. Provided upon said ends of the valve stem sections are bearing plates 42 forming the members of a coupling head, which bearing plates are connected by tie bolts 43 passing through spacing tubes 44 disposed between the head members, and whereby said head members are adjustably connected. The bolts also pass through the wear plates 41 which are removable upon disconnection of the bolts to permit new wear plates to be substituted for worn ones whenever required. A pivotal connection between the valve stem and control lever is thus provided which permits ready assemblage and disassemblage of these parts and of the ready and convenient renewal of a pivot pin 40 when the one in use becomes unduly worn. The upper end of stem section 18 is threaded to receive the internally threaded lower end of a valve cage or cylinder 45, closed at its upper end by a theaded cap 46 through which passes an abutment stem 47, which extends at its lower end into the cage 45 and is provided with an abutment head or flange 48, and which has its upper end threaded and engaging a threaded opening in the upper end of the bonnet and is adapted to be secured in adjusted position by a nut 49. Enclosed in the cage is a valve actuating spring 50, which is adapted to be disposed between the lower end of the cage and the abutment 48 to exert downward pressure on the valve stem for a valve opening movement, or which may be disposed between the abutment 48 and the top of the cage to exert upward pressure on the valve stem for a valve opening movement, the spring thus being reversible for such actions, and by adjustment of the abutment 47 the working pressure of the spring may be regulated in either of its set working positions.

The lever 35 is fulcrumed intermediate of its ends in a shiftable fulcrum disposed in the casing 4. This fulcrum comprises an openwork frame consisting of side plates 51 connected at their upper ends by a bolt or rivet 52 and at their lower ends by a cross-piece 53 secured thereto by screws or other suitable fastenings 54. The inner faces of these side plates are provided with bearing recesses 55 in which are anti-friction ball or roller bearings 56 in which are journaled the trunnions 57 of a bearing roller 58. The bearing roller 58 is provided with a transverse opening 59 for the passage of the lever 35 which extends therethrough and is slidably mounted therein. This roller, being mounted to turn freely in the shifting fulcrum frame, adapts the lever 35 to have easy rocking movements, and also adapts the roller to move longitudinally of the lever when the fulcrum is shifted. Connected with the cross-piece 53 are rods 60 which extend in opposite directions and outwardly through stuffing-boxes 61 at the opposite ends of the casing, the projecting ends of the rods forming finger pieces or handles whereby the fulcrum may be shifted from the outer side of the casing. It will, of course, be understood that only one of the rods need be employed, two being shown and preferably used in order to enable an adjusting operation to be carried out from one end of the lever casing in the event that the other end of the casing is disposed in close proximity to surrounding objects so that the rod at that end is not readily accessible.

The outer end of the casing 34 is provided in its top and bottom with openings 62 with which may be engaged a tubular coupling flange 63 at one side of a casing 64 containing a weighted diaphragm 65. This diaphragm is provided with a stem 66 coupled to the outer end of the lever by a fastening pin or bolt 67. When the diaphragm chamber is connected with the lower opening 62 and the stem 66 coupled to the outer end of the lever with the diaphragm in this position, the downward movement of the diaphragm, when subjected to fluid pressure in the casing 34 and adjacent side of the diaphragm chamber, causes the lever 35 to be turned for a valve opening action against the resistance of the spring 50 when the latter is arranged for a valve closing action, as shown. The chamber 64 may be reversed and engaged with the top opening 62 so that when the stem 66 is coupled to the lever 35 with the diaphragm chamber in such position, upward movement of the diaphragm under pressure from the casing 34 will cause the lever 35 to be tilted for a valve closing action. When the diaphragm is thus coupled for a valve closing action, the spring 50 is reversed, or disposed between the cap 46 of the cage 45 and the abutment 48 for a valve opening action, the spring and diaphragm thus in either operation acting in opposition to one another. In some cases, as when operated with low pressures, and with the diaphragm in the position shown in Figure 1, the spring may be dispensed with and reliance placed upon the force of gravity for closing the valves and holding them closed under the weight of the valves and valve stem. Except when working with very low pressures, however, the spring or a suitable weight equivalent is preferably employed. A cap or closure 67 is provided for sealing the opening 62 which is not in use for working coaction with the diaphragm. When the diaphragm is in the lower position shown in Figure 1, it is desirable to provide means for permitting vent of any liquid which may find its way into the chamber above the diaphragm. To this end the diaphragm is provided with a drain outlet 68 with which may be connected one end of a drain pipe 69 adapted to be secured at its opposite end in an opening in the casing 1, to allow the liquid from the diaphragm chamber to drain into the valve chamber 5 and from thence out through the port 2.

In the operation of this valve, the ports 2 and 3 may be interchangeably employed as inlet and outlet ports. When used as a back pressure or pressure restraining valve, the port 2 is the inlet port, the port 3 the outlet port, the valve is held closed by gravity or by disposing the spring 50 as shown in Figure 1, and the diaphragm is arranged for a valve opening action as also shown in Figure 1. When so employed, the valve will be set against the escape of pressure on the side 2 of the valve until a predetermined pressure is reached, such pressure acting on the diaphragm to open the valve against resistance of valve gravity or spring 50. When used as a pressure reducing valve, port 3 is employed as the inlet and port 2 as the outlet, the valve is set at the proper open position, the diaphragm reversed and employed as a valve closing device and the spring, if employed, reversed to act as a valve opening member operating in opposition to the closing pressure on the diaphragm. It will be observed that in this valve all the working parts are enclosed and protected from dirt, dust, the action of the elements and from possible casual derangement or injury, and that the use of the spring tension adjustment and shifting fulcrum, either or both, provides a means for a proper regulation of the power ratios of the lever arms so as to secure a very sensitive action of the valve. The spring described also permits ready access being afforded thereto for inspection and repairs with or without its disassemblage. This valve also has a wider degree of application for different pressure control actions than other valves of the character heretofore employed.

Having thus fully described my invention, I claim:—

1. In a pressure regulating valve, a casing having inlet and outlet ports at opposite sides, a partition in said casing forming an outer chamber and an inner chamber, the outer chamber being normally in communication with one of said side ports of the casing and the partition having a side port normally connecting the inner chamber with the other side port of the casing, said partition also having top and bottom ports communicating when open with the top and bottom of the outer chamber, and simultaneously movable balanced valve members controlling the top and bottom ports in the partition, the wall of the partition having the side port forming a dam wall to prevent flow of liquid into said port through the side port of the casing port with which it connects and the bottom wall of the casing being convexly curved between said dam wall and the other side port of the casing to provide for a drain of liquid entering the base of the casing through said port.

2. In a pressure regulating valve, a valve casing having side ports, a partition forming an inner chamber within the chamber of the casing and having top and bottom ports and a lateral port, the latter communicating with one of said side ports of the casing above the level of said side port and also above the level of the bottom of the casing chamber, the said bottom of the casing chamber sloping toward the other side port of the casing, and a valve controlling the top and bottom ports in the partition.

3. In a pressure regulating valve, a valve casing having side ports, a partition forming an inner chamber within the chamber of the casing and having top and bottom ports and a lateral port, the latter communicating with one of said side ports of the casing above the level of said side port and also above the level of the bottom of the casing chamber, the said bottom of the casing chamber sloping toward the other side port of the casing, and said bottom wall of the casing having an opening beneath the bottom port in the partition, a closure for said opening, and a valve controlling the top and bottom ports of the partition.

4. In a pressure regulating valve, a valve casing having side ports, a partition forming an inner chamber within the chamber of the casing and having top and bottom ports and a lateral port, the latter communicating with one of said side ports of the casing above the level of said side port and also above the level of the bottom of the casing chamber, the said bottom of the casing chamber sloping toward the other side port of the casing, and said bottom wall of the casing having an opening beneath the bottom port in the partition, a closure for said opening, a valve controlling the top and bottom ports in the partition, and coacting guide members on the valve and closure.

5. In a pressure regulating valve, a valve casing having valve seats, a valve composed of valve members engageable with said seats, a valve stem composed of sections with which the valve members are detachably connected, a flow reducer detachably mounted on each valve stem section below each valve member, and means for controlling the valve.

6. In a pressure regulating valve, a casing having valve seats, a valve stem comprising detachably connected sections and having a guide member at its lower end, a valve member detachably engaging each of the stem sections, a flow reducer detachably mounted on each valve stem section below each valve member, a guide for the upper end of the stem, and a guide member on the bottom of the valve casing telescopically engaging the guide member at the lower end of the stem.

7. In a pressure regulating valve, a casing having valve seats, a sectional valve stem, valve members for engagement with the seats each comprising a recessed body detachably engaging the stem sections, packing means carried by the body, and a flow reducer detachably mounted on each valve stem below the valve, and means for controlling the valves.

In testimony whereof I affix my signature.

ANDREW J. McEWAN.